J. W. JEPSON.
AUTOMATIC ELECTRIC REGULATOR.
APPLICATION FILED NOV. 29, 1907. RENEWED OCT. 8, 1913.
1,197,208.
Patented Sept. 5, 1916.
3 SHEETS—SHEET 1.
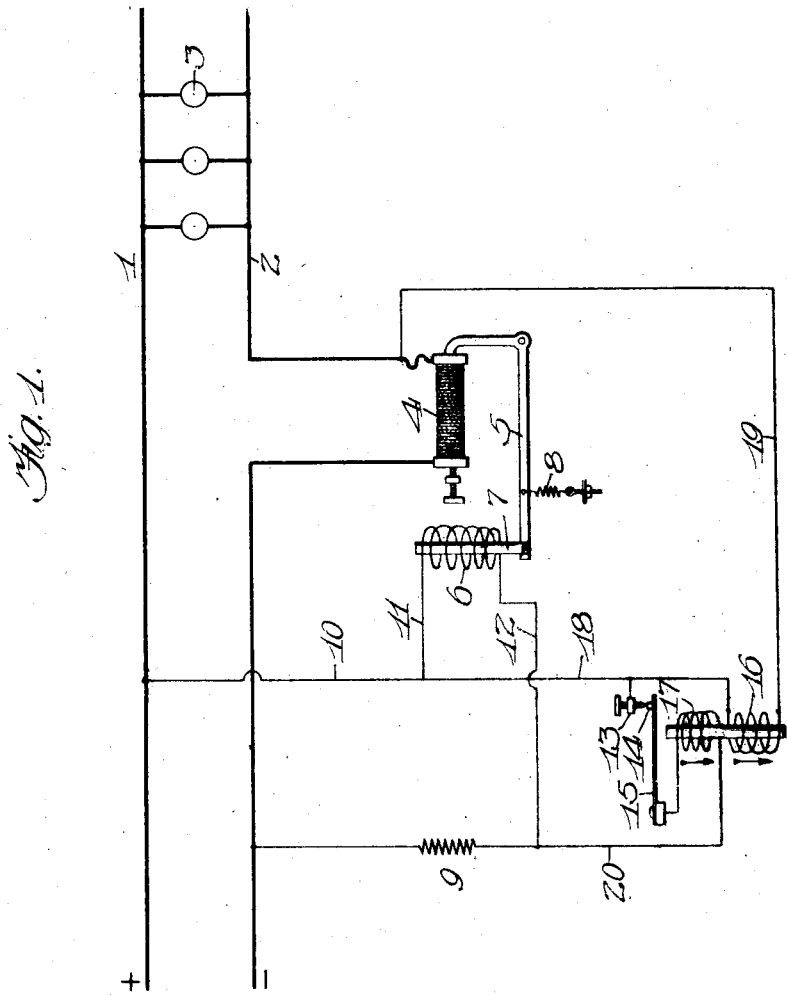

J. W. JEPSON.
AUTOMATIC ELECTRIC REGULATOR.
APPLICATION FILED NOV. 29, 1907. RENEWED OCT. 8, 1913.
1,197,208.
Patented Sept. 5, 1916.
3 SHEETS—SHEET 2.
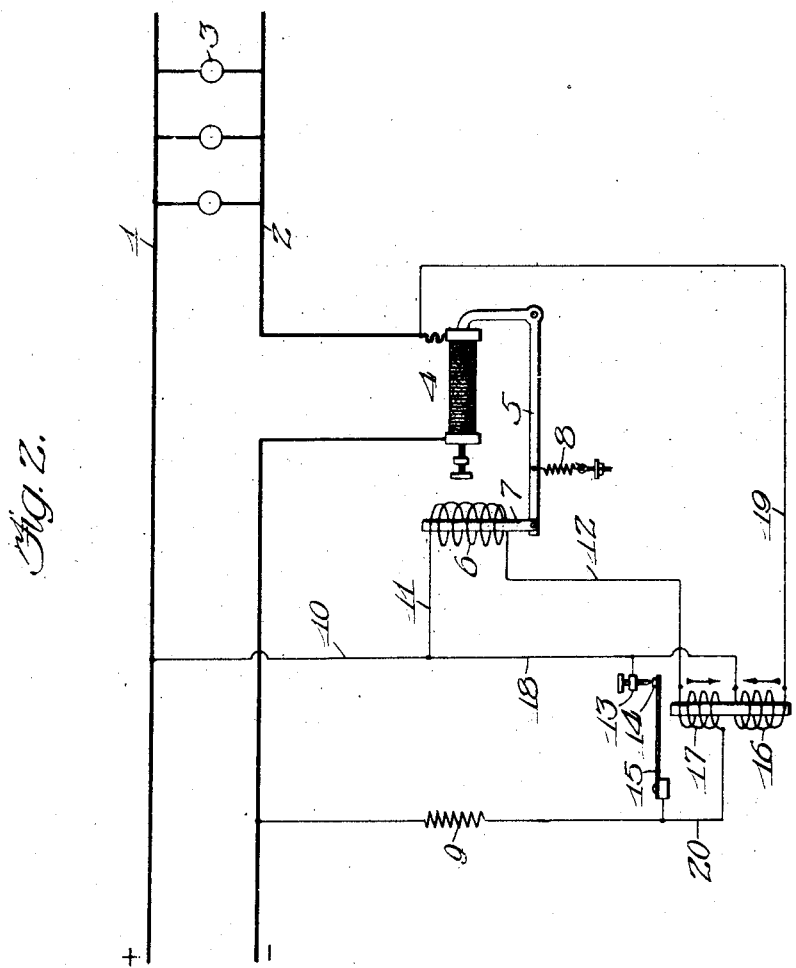

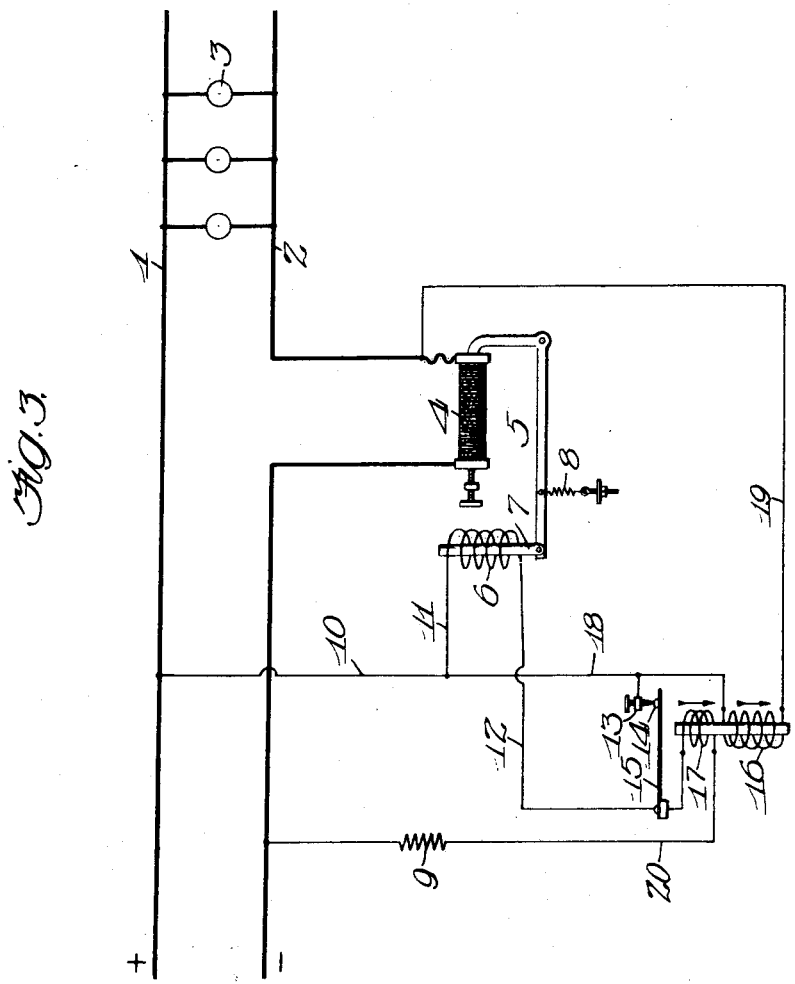

UNITED STATES PATENT OFFICE.

JOHN W. JEPSON, OF NEW YORK, N. Y., ASSIGNOR, BY MESNE ASSIGNMENTS, TO U. S. LIGHT & HEAT CORPORATION, OF NIAGARA FALLS, NEW YORK, A CORPORATION OF NEW YORK.

AUTOMATIC ELECTRIC REGULATOR.

1,197,208.  Specification of Letters Patent.  Patented Sept. 5, 1916.

Application filed November 29, 1907, Serial No. 404,271. Renewed October 8, 1913. Serial No. 794,158.

*To all whom it may concern:*

Be it known that I, JOHN W. JEPSON, a citizen of the United States, residing at New York, in the county of New York and State of New York, have invented new and useful Improvements in Automatic Electric Regulators, of which the following is a full, clear, concise, and exact description, reference being had to the accompanying drawing, forming a part of this specification.

My invention relates to improvements in automatic regulators.

I shall first outline one form of regulator to which my invention is applicable so as to lay the premise for describing certain details and phases of my invention. In general, the regulator as a whole consists of two regulators, a main regulator and an auxiliary regulator.

The main regulator may be of various forms and the regulating medium may be of any character, as, for instance, resistance, counter-electro-motive force, or other things. I shall assume that the regulating medium is a variable resistance. It may be used to regulate electrical conditions, either mediately or immediately, in a working circuit. To be more specific, I may cite two ways in which it may be used, though there are others that will be understood: One way would be to connect it directly in the working circuit, and the other would be to connect it in the field circuit of the generator which supplies current to the working circuit. In the first case it would regulate the electrical conditions in the working circuit directly or immediately, and in the latter, indirectly or mediately. The variable resistance is controlled by means of an electro-magnet which operates or controls suitable mechanism for varying resistance. This magnet is energized from a suitable source and may be called herein, for the purpose of distinction, the operating magnet. For a concrete example, it may be said that the main regulator consists of a variable resistance and an operating magnet.

The secondary regulator controls the action of the main regulator. It may assume different forms, but for the purpose of illustration I shall describe in brief the one that I prefer to employ in practice. It consists in general of a pair of separable electrodes and an electro-magnet. These electrodes may be called herein the regulating electrodes and the electro-magnet may be called the controlling magnet. One electrode is preferably mounted in a stationary position. The other is preferably mounted on a vibratile element, as, for instance, a vibratile reed. One end of the reed is held in a stationary position and the other carries the movable electrode. Of course the reed may form the movable electrode, and when I speak of the movable electrode, it will be so understood. The controlling magnet is connected to the circuit in which the electrical conditions are to be controlled, as, for instance, it may be connected across the working circuit. The reed preferably forms the armature of the controlling magnet. When the strength of the controlling magnet increases, the reed is attracted and when it decreases the reed is released. The reed is thus vibrated and causes the regulating electrodes to make and break contact. It may be said in general that the secondary regulator consists of separable electrodes and an electro-magnet which causes said electrodes to make and break contact.

The regulating electrodes are preferably connected in a short circuit around the operating magnet of the main regulator. When these electrodes are in contact, the short circuit is closed and when the same are out of contact, the short circuit is open. Hence, if the regulating electrodes make and break contact successively, the magnetism of the operating magnet will rise and fall. The mean value of the magnetism of the operating magnet depends upon the action of the auxiliary regulator and that in turn depends upon electrical conditions.

I shall now briefly describe the operation of the regulator.

When the voltage on the working circuit rises above a predetermined point the controlling magnet attracts the reed thereby separating the regulating electrodes and opening the short circuit around the operating magnet. The strength of the operating magnet then increases thereby increasing the resistance in the working circuit. The voltage is thereupon descreased and the controlling magnet is weakened. The reed is then released and the regulating contacts again short circuit the operating magnet. The strength of the operating magnet is thus decreased and consequently the resistance in the working circuit decreases allowing the voltage to rise again. The regulator thus passes through a cycle of operation during which cycle the voltage on the working circuit rises slightly and then falls slightly, the reed being attracted and released upon slight variation in voltage. The steps in each cycle follow each other so rapidly that said cycles are repeated at high frequency. The reed is kept in a state of rapid vibration, and the resistance is raised and lowered in accordance with the rate of vibrations of the reed. In consequence of these variations in resistance, the voltage rises and falls accordingly, which, in turn sets up the vibration of the reed. Each element of the regulator is so sensitive to the conditions by which it is influenced, that the rise and fall in voltage are checked within very narrow limits and hence the variations in voltage are almost imperceptible.

It is to a regulator consisting of a main regulator and an auxiliary regulator, such as I have outlined, that my invention is particularly applicable.

The object of my invention is to cause the controlling magnet to attract and release the reed upon minute variations in voltage.

In accordance with my invention I provide means to counteract the variations in the air-gap between the magnet and the reed or armature. In other words, I provide means whereby the tractive effect between the magnet and the reed is decreased when the reed is attracted and increased when it is released, thus causing the controlling magnet to attract and release the reed upon practically infinitesimal variations in voltage.

In order to bring out more particularly the nature of my invention, I shall refer a little further to the action of the controlling magnet upon the reed. When the controlling magnet attracts the reed, the air-gap between the reed and the magnet-pole is reduced. The greater the decrease in the air-gap, the greater is the fall in potential that is necessary to decrease the strength of the magnet sufficiently to release the reed, so conversely, the greater the air-gap, the greater is the rise in potential that is necessary to increase the magnet-strength sufficiently to attract the reed. In accordance with my invention, I provide means for counteracting, in a measure at least, the variations in the air-gap so as to lessen the extent of the fluctuations in voltage required to cause the magnet to attract and release the reed.

There are various ways in practice in which the ends of my invention may be attained. I shall set forth some of these ways in this application so as to enable those skilled in the art to carry out my invention in its various phases.

Both mechanical and electrical means may be used to counteract the variations in the air-gap between the magnet and the reed, and each may be of various forms and may be used in different ways. Herein I shall describe particularly certain electrical means that may be used. These means are so interrelated and functioned with the elements in the regulator that when the magnet attracts the reed the strength of the magnet is reduced, and when the magnet releases the reed the strength of the magnet is increased. In practice I prefer to provide a magnet with two coils. One of these coils is connected in circuit to be subjected to the electrical conditions which the regulator controls. The other is so connected in circuit that when the reed is attracted it reduces the strength of the magnet and when the reed is released it increases the strength of the magnet.

I shall now proceed to describe in particular several forms of my invention which I have worked out in practice. These forms of my invention employ electrical means to counteract the effect of the variations in the air-gap, between the reed and the magnet.

The views in the drawings are as follows:

Figure 1 shows a regulator in which the controlling-magnet is provided with a modifying coil, the circuit of which is open when the reed is attracted. Fig. 2 shows a regulator in which the controlling-coil is provided with a differential modifying coil, which becomes energized when the reed is attracted; and Fig. 3 shows a regulator in which the strength of the modifying coil is reduced by external means coming into circuit therewith, when the reed is attracted.

The drawings show the regulator applied to regulate the voltage impressed upon a circuit 1—2, to which are connected translating devices 3, of any form. The regulating medium is shown as a resistance in the form of a pile of resistance-blocks 4, the resistance of which may be varied by varying the pressure upon the blocks. In practice, the resistance blocks are usually made of carbon, but, of course, they may be made of other material and may assume various forms. One end of the pile of blocks is engaged by a pivoted lever 5 which is actuated by an electro-magnet 6. The other end is held in a stationary position.

The magnet 6, which is herein called the operating-magnet or winding, attracts a plunger 7 which is connected to the lever. The resistance blocks are normally held under pressure by means of a spring 8 which acts upon the lever 5. The operating-magnet is connected across the circuit 1—2 in series with a resistance 9. Its circuit extends from the conductor 1, through the conductor 10, conductor 11, the winding 6, conductor 12, resistance 9, to the negative conductor 2.

The operating-magnet is normally short-circuited by means of a pair of separable electrodes or contacts 13 and 14, which may be called herein, for the purpose of distinction, the regulating-electrodes. The resistance 9 prevents a short-circuit across the circuit 1—2, when the operating-magnet 6 is short circuited. The electrode 13 is stationary and the electrode 14 is movable, the latter being mounted upon the free end of a vibratile reed 15. Owing to the peculiar action of the elements of the regulator the reed is set in vibration by a magnet which is provided with a main coil 16 and a modifying coil 17. This magnet which is herein called the controlling-magnet, for the purpose of distinction, is connected in circuit to respond to the electrical condition on the circuit 1—2. It controls the vibration of the reed which causes the movable electrode 14 to make and break contact with the stationary electrode 13. This action of the regulating-electrodes regulates the strength of the operating-magnet through which the resistance of the resistance-blocks is varied. Of course, a condenser or other means may be connected across the regulating-electrodes to reduce sparking. The coils 16 and 17 are additive or cumulative. When the regulating-electrodes are separated, the modifying coil is deënergized and hence the strength of the controlling-magnet is reduced. The main coil is connected across the circuit 1—2 inside the regulating resistance so as to be subjected to the same voltage as the translating devices. Its circuit extends from the positive line 1 through the conductor 10, conductor 18, coil 16, conductor 19, to the negative line 2. The coil 17 is connected in circuit in series with the regulating-electrodes 13—14. When the regulating-electrodes are in contact the operating coil 6 is short-circuited and the coil 17 is connected in the short-circuit. The short circuit established by the separable electrodes extends from the positive line 1 through the conductor 10, conductor 18, electrodes 13 and 14, reed 15, modifying coil 17, conductor 20 and resistance 9 to the negative conductor 2. The modifying coil is thus energized and supplements the action of the main coil 16. When the regulating-electrodes are separated the modifying coil is deënergized and hence the pull upon the reed is decreased.

I shall now describe the operation of the regulator.

Let it be assumed that it is desired to maintain practically 60 volts upon the translating devices 3 and that the voltage of the source of electrical energy is higher than 60 volts. There is therefore a continuous tendency for the voltage upon the translating devices to rise above 60 volts. The main coil of the controlling magnet is subjected to the same voltage as the translating devices. When the voltage rises slightly above the 60 volts the strength of the controlling magnet increases sufficiently to attract the reed, thereby separating the regulating-electrodes which thereupon open the short-circuit around the operating magnet 6. The strength of the operating-magnet then increases causing a corresponding decrease in the pressure between the resistance blocks 4. Hence, the resistance in circuit is increased, thereby checking the rise in voltage. The resistance will increase sufficiently to cause the voltage to fall. This reduction in voltage will weaken the main coil 16. Meanwhile the coil 17 has become deënergized owing to the opening of its circuit by the separable electrodes. Therefore, a very slight reduction in voltage will decrease the strength of the controlling-magnet sufficiently to release the reed, thereby allowing the regulating-electrodes to again make contact and short-circuit the operating magnet. The resistance of the resistance blocks will therefore be decreased. So, the voltage will rise again, and cause the previous cycle of operation to be repeated. This cycle of operation is repeated at high frequency, the reed being kept in a state of rapid vibration. Inasmuch as the reed is attracted and released upon very slight variations in voltage, the fluctuations in voltage on the translating circuit are almost imperceptible, the rise and fall in voltage being checked within narrow limits. Naturally there is a time-lag in the operating-magnet 6. Hence, the strength of the magnet cannot increase to a maximum the instant the short-circuit is opened, nor fall to a minimum the instant the short-circuit is closed. So it follows that the operating-magnet is really not fully energized and totally deënergized alternately during each cycle of operation, as the cycle of operation takes place too rapidly. But what really takes place is that there is a fluctuation in the strength of the operating-magnet corresponding to the vibration of the reed, and these fluctuations are re-produced in the resistance.

Inasmuch as the modifying coil 17 is deënergized when the reed is attracted, the strength of the controlling-magnet is reduced and hence the controlling-magnet will release the reed upon a slighter variation in voltage than would otherwise be the case. Likewise, inasmuch as the modifying coil 17 is energized when the reed is released the strength of the controlling-magnet is increased and hence the controlling-magnet will attract the reed upon a slighter increase in voltage than would otherwise be the case. So it follows that the modifying coil counteracts the variations in the air-gap between the reed and the controlling-magnet, and accordingly the controlling-magnet will attract and release the reed upon practically imperceptible variations in voltage. In fact, the fluctuations in voltage are practically infinitesimal so it may be said that constant voltage is maintained.

Other ways of connecting the modifying coil in circuit are illustrated in Figs. 2 and 3. In Fig. 2 the modifying coil is a differential coil. When it is energized it opposes the main coil and hence reduces the strength of the magnet. This coil is so connected in circuit that it is normally short-circuited by the regulating-electrodes. When the controlling-magnet attracts the reed, the short circuit is opened thereby allowing the modifying coil to become energized and reduce the strength of the controlling magnet, so that the controlling magnet will release the reed upon a slight fall in voltage. When the regulating electrodes are separated the short-circuit is opened. The circuit then extends from the positive line through conductor 10, conductor 11, the coil 6, conductor 12, coil 17, conductor 20 and resistance 9 to the negative line. When the regulating electrodes are in contact, the short-circuit around the coils 6 and 17 extends from the positive line through conductor 10, conductor 18, separable electrodes 13 and 14, reed 15 and resistance 9 to the negative line. The coil 17 may, of course, be connected otherwise than in series with the coil 6.

In Fig. 3 the modifying coil is additive as in Fig. 1. This coil is arranged in circuit with a resistance which, in the present instance, is the operating-winding 6. When the regulating electrodes are in contact the resistance, that is, the operating-coil 6, is short-circuited. Hence the modifying coil is energized and it supplements the strength of the main coil. Its circuit extends from the positive line through conductor 10, conductor 18, electrodes 13 and 14, reed 15, coil 17, conductor 20 and resistance 9 to the negative line. When the regulating electrodes are separated the short circuit is opened. The resistance of the operating-coil 6 then reduces the current in the modifying coil 17. Hence, the strength of the controlling-magnet is reduced.

As already said, various mechanical means may be used to counteract the variations in the air-gap between the reed and the controlling magnet. Such means make provision for increasing the force, tending to urge the reed away from the magnet as it is attracted.

The regulator which I have described herein will serve to depict my invention, so that it may be embodied in various forms and applied in different relations to attain the ends that I have in view.

Having thus described my invention what I claim as new and desire to secure by Letters Patent is:

1. In an electric regulator, in combination an operating magnet, a pair of separable electrodes connected with said magnet, a controlling electro-magnet, a vibratile reed forming the armature of said electromagnet and carrying one of the said electrodes and a modifying coil for said controlling electro-magnet in circuit with said separable electrodes, the strength of which coil is decreased when said electrodes are separated and increased when said electrodes are in contact.

2. The combination in an electric regulator for regulating the electrical condition upon a working circuit, of an operating magnet for controlling the action of said regulator, a pair of separable electrodes connected in a short circuit around said operating magnet, a vibratile reed carrying one of said electrodes, an electro-magnet arranged to attract said reed and having two coils, one adapted to be connected across said working circuit and the other connected in circuit in series with said electrodes.

3. In an electric regulator, a variable resistance, an electro-magnet for varying said resistance, a pair of separable electrodes connected in a short circuit around said magnet, a vibratile reed carrying one of said electrodes, a controlling electro-magnet arranged to attract said reed and having two coils, one adapted to be connected across the circuit in which electrical conditions are to be regulated, and the other connected in circuit in series with said separable electrodes.

4. Means for regulating a circuit including a pile of resistance blocks adapted to be connected in the circuit to be regulated, an operating magnet for varying the pressure upon said blocks, a pair of separable electrodes connected in a short circuit around said operating magnet, a vibratile reed carrying one of said electrodes, a controlling electro-magnet having two coils, one adapted to be permanently connected across the said circuit and the other connected in circuit in series with said separable electrodes.

5. In an electric regulator, in combination an operating magnet, a pair of separable electrodes connected in circuit with said magnet, a controlling electromagnet, a vibratile reed forming the armature of said electromagnet and carrying one of said electrodes, said reed being rigidly secured at one end, and a modifying coil for said controlling electromagnet in circuit with said separable electrodes the strength of which coil is decreased when said electrodes are separated and increased when said electrodes are in contact.

6. In combination, a circuit to be regulated, a variable resistance for regulating said circuit, a coil for controlling or regulating said resistance, a vibratile reed for varying the current in said coil, said reed being rigidly secured at one end, a magnet for causing said reed to vibrate and means for varying the strength of said magnet as the reed moves toward or away from the same.

7. In combination, a translation circuit to be regulated, a compressible rheostat in series in said circuit, a direct current coil for operating said rheostat, a vibratile reed armature and coöperating contact for regulating the current in said coil, a direct current coil for attracting said armature and a coil for compensating for the varying reluctance of the air gap between said reed and its armature.

8. In an electric regulator, in combination, a variable resistance adapted to be connected in the circuit to be regulated, an operating winding for controlling said resistance, a shunt circuit around said operating winding, contacts in said shunt circuit normally in contact, one of which is adapted to vibrate rapidly to open and close said shunt circuit at a rapid rate, a controlling winding for causing said vibrations and an auxiliary coil for accelerating said vibrations.

9. An automatic electric regulator comprising a variable resistance, an electromagnetic winding for varying said resistance, a resistance in series with said winding, a voltage responsive relay for short-circuiting said winding at a rapid rate without short-circuiting the second mentioned resistance and an auxiliary coil associated with said relay for accelerating said vibrations.

10. In combination, a variable resistance, an electro-magnetic winding for varying said resistance, and means for controlling the energization of said electro-magnetic winding, said means including a relay having an armature consisting of a resilient reed adapted to vibrate rapidly and having means for compensating for the varying reluctance of the air gap.

11. A regulator comprising a resistance, an electro-magnetic winding for varying said resistance, a second resistance in series with said winding, a vibratile reed controlling a shunt circuit around said winding, a voltage winding controlling the vibrations of said reed and means for compensating for the varying reluctance of the air gap between said reed and its controlling winding.

12. An automatic electric regulator having a vibrating relay controlling the operation thereof, said relay having an operating electro-magnet responsive to changes in electrical conditions therein and means for modifying the effectiveness of said magnet whereby said relay responds to changes of less value than those to which said magnet is directly responsive.

13. An electrical circuit including an automatic electric regulator having a relay controlling the operation thereof, said relay having an operating electro-magnet and means for increasing and decreasing the effective strength of said magnet to a greater degree than the normal variations in the strength thereof due directly to changes in electrical conditions in the circuit.

14. An automatic electric regulator having an operating winding, means arranged in a shunt circuit around said winding for varying the amount of current diverted around the same to vary the energization thereof, and auxiliary means for causing said first means to respond to very minute variations to increase the sensitiveness of the regulator.

15. In an automatic electric regulator, a resilient reed adapted to vibrate rapidly to control a short circuit around an element of said regulator, a controlling magnet for causing said vibrations, and an auxiliary winding for compensating for the varying reluctance of the air gap between said reed and said magnet.

16. A circuit and means for regulating said circuit, said means including an operating coil, means for controlling the energization of said coil, said controlling means including a second coil operating responsive to varying conditions in the circuit to be regulated to increase or decrease the energization of said first coil and means for increasing the effectiveness of said last coil during the time it is decreasing the energization of said first coil and for decreasing the effectiveness thereof during the time it is increasing the energization of said first coil.

In witness whereof, I have hereunto subscribed my name in the presence of two witnesses.

JOHN W. JEPSON.

Witnesses:
GEORGE R. BERGER,
FRANK H. HUBBARD.

Copies of this patent may be obtained for five cents each, by addressing the "Commissioner of Patents, Washington, D. C."